(12) United States Patent
Harada et al.

(10) Patent No.: US 8,385,273 B2
(45) Date of Patent: Feb. 26, 2013

(54) MOBILE STATION, BASE STATION, AND COMMUNICATION CONTROL METHOD

(75) Inventors: Atsushi Harada, Kawasaki (JP); Anil Umesh, Yokohama (JP); Sadayuki Abeta, Yokohama (JP)

(73) Assignee: NTT Docomo, Inc., Tokyo (JP)

( * ) Notice: Subject to any disclaimer, the term of this patent is extended or adjusted under 35 U.S.C. 154(b) by 973 days.

(21) Appl. No.: 12/299,298

(22) PCT Filed: May 1, 2007

(86) PCT No.: PCT/JP2007/059321
§ 371 (c)(1),
(2), (4) Date: Dec. 9, 2008

(87) PCT Pub. No.: WO2007/129645
PCT Pub. Date: Nov. 15, 2007

(65) Prior Publication Data
US 2009/0225708 A1    Sep. 10, 2009

(30) Foreign Application Priority Data

May 1, 2006 (JP) .................................. 2006-127999

(51) Int. Cl.
*H04W 4/00* (2009.01)
(52) U.S. Cl. ........................................................ 370/329
(58) Field of Classification Search ................... None
See application file for complete search history.

(56) References Cited

U.S. PATENT DOCUMENTS

2004/0032853 A1   2/2004   D'Amico et al.
2007/0133458 A1*  6/2007   Chandra et al. ............... 370/329

FOREIGN PATENT DOCUMENTS

| EP | 1 784 036 | 5/2007 |
|----|-----------|--------|
| JP | 2001-352315 | 12/2001 |
| JP | 2002-186014 | 6/2002 |
| JP | 2005-536149 | 11/2005 |
| WO | 2006/016457 | 2/2006 |

OTHER PUBLICATIONS

Philips, LTE HARQ signaling considerations, 3GPP TSG RAN WG1 LTE Adhoc, Helsinki, Finland, Jan. 23-25, 2006, Tdoc R1-060007.*
Japanese Office Action for Application No. 2008-514467, mailed on Jan. 4, 2010 (4 pages).
NTT DOCOMO, Fujitsu, Mitsubishi Electric, NEC, Sharp, Toshiba Corporation, Hybrid ARQ Scheme for E-UTRA Downlink, 3GPP TSG-RAN WG1 and WG2 Joint Meeting, 3GPP, Mar. 27, 2006, R2-060840, URL http://www.3gpp.org/ftp/tsg_ran/WG2_RL2/TSGR2_52/Documents/R2-060840.zip.
International Search Report (English & Japanese) for PCT/JP2007/059321 mailed Aug. 7, 2007 (5 pages).

(Continued)

*Primary Examiner* — Chi Pham
*Assistant Examiner* — Kouroush Mohebbi
(74) *Attorney, Agent, or Firm* — Osha Liang LLP

(57) ABSTRACT

A base station according to the present invention includes: a scheduling unit configured to perform a persistent scheduling for transmitting data at a predetermined timing; and a scheduling information generating unit configured to generate scheduling information and to notify the scheduling information to a predetermined mobile station, when the persistent scheduling is performed. The scheduling information includes resource assignment information that indicates a radio resource assigned to the predetermined mobile station at the predetermined timing in the persistent scheduling.

2 Claims, 9 Drawing Sheets

OTHER PUBLICATIONS

Written Opinion of ISA (Japanese) (4 pages).

3GPP TSG RAN WG2 Ad Hoc on LTE, Cannes, France, Jun. 27-30, 2006 "Persistent Scheduling" R2-061920 Source: NTT DoCoMo, Inc. (5 pages).

TSG-RAN WG1 LTE Ad Hoc, Helsinki, Finland, Jan. 23-25, 2006 "Persistent Scheduling for E-UTRA" R1-060099 Source: Ericsson (2 pages).

3GPP TSG-RAN WG1 LTE Ad Hoc, Helsinki, Finland, Jan. 23-25, 2006 "Considerations for Control Signalling Support of Real Time Services" R1-060173 Source: Qualcomm Europe (5 pages).

3GPP TSG-RAN WG2 meeting #51, Denver, Colorado, USA, Feb. 13-17, 2006 "Further Details on HS-SCCH-less Operation for VoIP Traffic" R2-060550 Source: Qualcomm Europe (7 pages).

Japanese Office Action for Application No. 2008-514467, mailed on Apr. 5, 2011 (4 pages).

\* cited by examiner

FIG. 6

| | CATEGORY | | AT TRANSITION TIME | FIRST TRANSMISSION DURING PERSISTENT SCHEDULING | AT RETRANSMISSION TIME |
|---|---|---|---|---|---|
| CAT. 1 RESOURCE INDICATION | UE ID | | NOTIFY | NOTIFICATION UNNECESSARY | NOTIFY |
| | RESOURCE ASSIGNMENT | | NOTIFY | NOTIFICATION UNNECESSARY (IF PERSISTENT RBs ASSIGNMENT) | NOTIFY |
| | DURATION ASSIGNMENT | | NOTIFY | NOTIFICATION UNNECESSARY (FIXED AT TRANSITION TIME) | NOTIFY |
| | PERSISTENT START FLAG | | NOTIFY | NOTIFICATION UNNECESSARY | NOTIFICATION UNNECESSARY |
| CAT. 2 TRANSPORT FORMAT | MULTI-ANTENNA RELATED INFO | | NOTIFY | NOTIFICATION UNNECESSARY (FIXED AT TRANSITION TIME) | NOTIFY |
| | MODULATION SCHEME | | NOTIFY | NOTIFICATION UNNECESSARY (FIXED AT TRANSITION TIME) | NOTIFY |
| | PAYLOAD SIZE | | NOTIFY | NOTIFICATION UNNECESSARY (FIXED AT TRANSITION TIME) | NOTIFY |
| CAT. 3 HARQ | PROCESS #: | | NOTIFY | NOTIFICATION UNNECESSARY (RESERVED) | NOTIFY |
| | RV: | | NOTIFY | NOTIFICATION UNNECESSARY (RV OF FIRST TRANSMISSION IS FIXED) | NOTIFY |
| | NDI: | | NOTIFY | NOTIFICATION UNNECESSARY (FIRST TRANSMISSION TIMING IS KNOWN) | NOTIFY |

MOBILE STATION, BASE STATION, AND COMMUNICATION CONTROL METHOD

TECHNICAL FIELD

The present invention relates to a mobile station, a base station and a communication control method.

BACKGROUND ART

In the real-time service, characteristics of an application, for example, characteristics of VoIP (Voice over Internet Protocol) or the like is mapped to each radio bearer (RB), as a QoS-related attribute.

Here, a radio bearer indicates a logical channel that provides QoS to data (packets) transmitted between a base station and a mobile station.

Accordingly, it is assumed that an application type is not estimated in the MAC layer.

HSDPA (High Speed Downlink Packet Access) is configured so that, at each TTI (Transmission Time Interval) through an HS-SCCH (High speed-Shared Control Channel), a mobile station is notified of an assignment of a transmission opportunity to the downlink data addressed to the mobile station.

However, the data is transmitted, for example, once in every tens ms in a characteristic traffic, such as a voice traffic. Accordingly, when a configuration is employed in which the assignment of the transmission opportunity to the data is notified through a channel equivalent to the HS-SCCH, overhead of a signaling channel is made too large to achieve efficiency.

In this regard, in standardization of evolved UTRA, "persistent scheduling" is proposed, in which according to characteristics of the application, the transmission opportunity is assigned to the data used for the application based on a predetermined period. In other words, the persistent scheduling is proposed, in which the data for the application is transmitted at a predetermined timing (for example, see Non-patent Documents 1, 2, and 3).

For example, in the persistent scheduling, as an attribute of the radio bearer whether or not the persistent scheduling is applicable, that is, a period during which the persistent scheduling is performed (persistent scheduling period), is set.

For example, the persistent scheduling period is set based on a frame unit (N×10 msec: N is an integer of N>0).

When the persistent scheduling period is set as "0," the persistent scheduling is not applied in the radio bearer.

There has also been proposed combined use of such persistent scheduling and a scheduling (usual scheduling) in which a transmission opportunity of data is assigned at each TTI to a mobile station having a preferable radio channel condition.

However, a method has not been proposed wherein an asynchronous HARQ is used as a retransmission control processing when the persistent scheduling is performed.

Moreover, in the conventional persistent scheduling, each mobile station is configured to use a radio resource fixedly assigned to the mobile station when a particular radio bearer is set, and the mobile station communicates by using the particular radio bearer. For this reason, there has been a problem in the conventional persistent scheduling that the radio resource fixedly assigned to the mobile station cannot be changed for each persistent scheduling period.

Non-patent Document 1: Ericsson, R1-060099, "Persistent Scheduling for E-UTRA," TSG-RAN WG1 LTE AdHoc Helsinki, Finland, Jan. 23-25, 2006

Non-patent Document 2: QUALCOMM Europe, R1-060173, "Considerations for control signalling support of Real Time Services," 3GPP TSG-RAN WG1 LTE AdHoc, Helsinki, Finland, Jan. 23-25, 2006

Non-patent Document 3: Qualcomm Europe, R2-060550, "Further details on HS-SCCH-less operation for VoIP traffic," 3GPP TSG-RAN WG2 meeting #51, Denver, Colo., USA, Feb. 13-17, 2006

DISCLOSURE OF THE INVENTION

Thus, the present invention has been made in consideration of the above-mentioned problems, and has an object of providing a mobile station, a base station, and a communication control method which can perform a retransmission control processing when the persistent scheduling is performed, when the persistent scheduling and the usual scheduling are simultaneously applied.

Moreover, the present invention also has an object of providing a mobile station, a base station, and a communication control method, which can change a radio resource fixedly assigned to the mobile station in each persistent scheduling period.

A first aspect of the invention is summarized as a base station, including: a scheduling unit configured to perform a persistent scheduling for transmitting data at a predetermined timing; and a scheduling information generating unit configured to generate scheduling information and to notify the scheduling information to a predetermined mobile station, when the persistent scheduling is performed. The scheduling information may include resource assignment information that indicates a radio resource assigned to the predetermined mobile station at the predetermined timing in the persistent scheduling.

In the first aspect of the invention, the base station may further include a retransmission control unit configured to perform a retransmission control processing on the data, when the persistent scheduling is performed.

In the first aspect of the invention, the retransmission control unit may be configured to assign a radio resource used for retransmitting the data, at an any timing after a certain time period has elapsed from a timing of a first transmission of the data.

In the first aspect of the invention, the scheduling information generating unit may be configured to generate the scheduling information and to notify the scheduling information to the predetermined mobile station every time the data is retransmitted, when the persistent scheduling is performed.

In the first aspect of the invention, the base station may further include: a scheduling unit configured to perform a persistent scheduling for transmitting data at a predetermined timing; a process number determining unit configured to determine a process number that identifies a HARQ process for transmitting the data to a predetermined mobile station, when the persistent scheduling is performed; and a notification unit configured to notify, to the predetermined mobile station, the process number determined by the process number determining unit.

In the first aspect of the invention, the notification unit may be configured to notify, to the predetermined mobile station, the process number determined by the process number determining unit, by using an RRC signaling.

In the first aspect of the invention, the notification unit may be configured to notify, to the predetermined mobile station, the process number determined by the process number determining unit, by using of a MAC control PDU.

In the first aspect of the invention, the notification unit may be configured to notify, to the predetermined mobile station, the process number determined by the process number determining unit by using scheduling information; and the scheduling information may be notified to the predetermined mobile station when the persistent scheduling is performed.

In the first aspect of the invention, the notification unit may be configured to notify, to the predetermined mobile station, the process number determined by the process number determining unit, when the persistent scheduling is started.

In the first aspect of the invention, the resource assignment information may indicate a radio resource in a downlink, which is fixedly assigned to the predetermined mobile station at the predetermined timing.

In the first aspect of the invention, the resource assignment information may indicate a radio resource in an uplink, which is fixedly assigned to the predetermined mobile station at the predetermined timing.

A second aspect of the invention is summarized as a mobile station, including: a scheduling information decoding unit configured to decode scheduling information transmitted from a base station when a persistent scheduling is performed; and a receiving unit configured to receive downlink data addressed to the mobile station and transmitted from the base station at a predetermined timing, based on a decoded result of the scheduling information. The scheduling information may include resource assignment information that indicates a radio resource fixedly assigned to the mobile station at the predetermined timing in the persistent scheduling.

In the second aspect of the invention, the scheduling information may include a process number that identifies a HARQ process for transmitting the data to the mobile station, when the persistent scheduling is performed; and the receiving unit may be configured to detect retransmitted downlink data based on the process number, when the persistent scheduling is performed.

In the second aspect of the invention, the mobile station may further include a combining unit configured to combine the downlink data transmitted in a first transmission in which an error is detected, with the retransmitted downlink data.

A third aspect of the invention is summarized as a mobile station, including: a scheduling information decoding unit configured to decode scheduling information transmitted from a base station when a persistent scheduling is performed; and a transmitting unit configured to transmit uplink data to the base station at a predetermined timing, based on a decoded result of the scheduling information. The scheduling information may include resource assignment information that indicates a radio resource fixedly assigned to the mobile station at the predetermined timing in the persistent scheduling.

A fourth aspect of the invention is summarized as a communication control method, including performing, between a base station and a mobile station, persistent scheduling for transmitting data at a predetermined timing; generating, at the base station, scheduling information; notifying, from the base station to a predetermined mobile station, the scheduling information generated by the base station; decoding, at the predetermined mobile station, the scheduling information notified from the base station; and transmitting and receiving, between the base station and the predetermined mobile station, the data at the predetermined timing, based on a decoded result of the scheduling information. The scheduling information may include resource assignment information that indicates a radio resource fixedly assigned to the predetermined mobile station at the predetermined timing in the persistent scheduling.

BRIEF DESCRIPTION OF THE DRAWINGS

FIG. 6 is an explanatory view showing an example of the scheduling information.

BEST MODES FOR CARRYING OUT THE INVENTION

First Embodiment of the Present Invention

A first embodiment of the present invention will be described with reference to the drawings. In all the drawings for describing this embodiment, identical numerals are used for components having the same function, and redundant explanation will be omitted.

Hereinafter, a radio communication system according to a first embodiment of the present invention will be described. The radio communication system according to this embodiment includes a base station 100 and a mobile station 200.

Firstly, description will be given for a synchronous HARQ (hybrid automatic repeat request) and an asynchronous HARQ.

The synchronous HARQ is a method of assigning a retransmission opportunity to the data after a certain time period has elapsed from a timing of a first transmission of the data. For example, a retransmission opportunity is assigned to the data so that the data is retransmitted when at least a certain time period has elapsed after an Ack/Nack for the data is transmitted from a receiving side apparatus.

Since each data is retransmitted at a constant interval in such synchronous HARQ, an identifier that indicates the data retransmitted at a predetermined timing (for example, in a predetermined sub-frame) is not required.

By referring to FIG. 1, a description will be given for an example in which one radio frame consists of 20 sub-frames and a retransmission interval of data is 6 sub-frames at the shortest.

Figure 1:
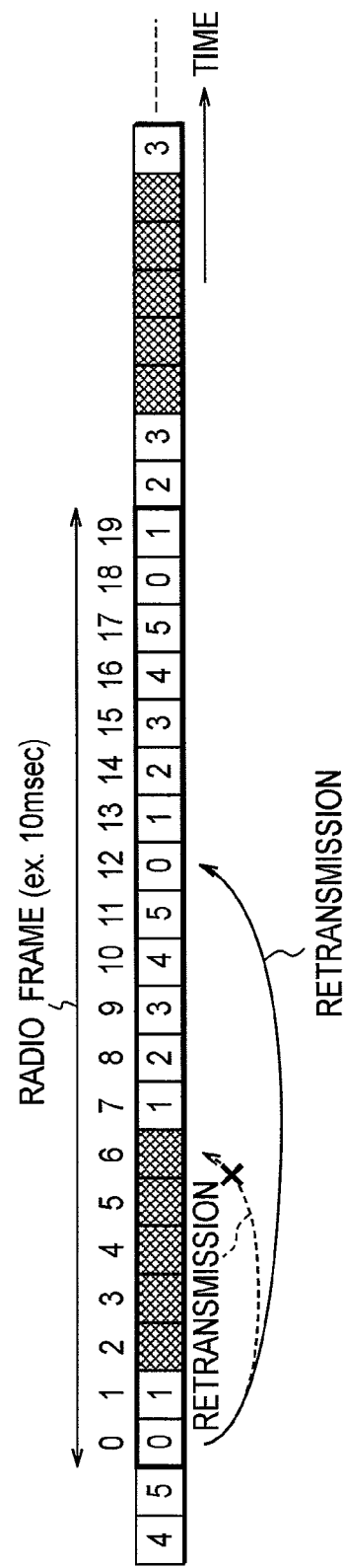
FIG. 1 is an explanatory view showing synchronous HARQ.

In FIG. 1, each of numeric values (0 to 5) in boxes indicates a process number identifying a process in the HARQ, and each of numeric values (0 to 19) above the boxes indicates a sub-frame number.

In the synchronous HARQ, the retransmission opportunity is assigned to the data transmitted in the sub-frame having a process number "0", so that the data is to be transmitted after a certain time period has elapsed since the Ack/Nack is transmitted from the receiving side apparatus having a process number "0" (for example, in a sub-frame having a sub-frame number "6")

However, when the sub-frame having a sub-frame number "6" is used for the uplink transmission in MBMS or TDD (Time Division Duplex), for example, the sub-frame having a sub-frame number "6" cannot be used for retransmitting the data.

In this case, the retransmission opportunity is assigned to the data so that the data is to be transmitted after a certain time period has elapsed from the transmission of the sub-frame having the sub-frame number "6", in other words, after the above-mentioned retransmission interval (6 sub-frames) has passed. (for example, in the sub-frame having a sub-frame number is "12").

Thus, the retransmission timing of each data is known in synchronous HARQ. Accordingly, it is not required for the receiving side apparatus to be specifically notified of the data retransmitted in a predetermined sub-frame.

On the other hand, the asynchronous HARQ is a method of assigning a retransmission opportunity to the data so that the data is retransmitted at an any timing after the certain period has elapsed from a timing of a first transmission of the data. For example, a retransmission opportunity is assigned at an any timing when at least a certain time period has elapsed after an Ack/Nack for the data is transmitted from the receiving side apparatus.

Unlike the synchronous HARQ, the asynchronous HARQ requires an identifier (for example, a process number) that indicates the data retransmitted at a predetermined timing (for example, in a predetermined sub-frame).

By referring to FIG. 2, a description will be given for an example in which one radio frame consists of 20 sub-frames and the retransmission interval of data is 6 sub-frames.

Figure 2:
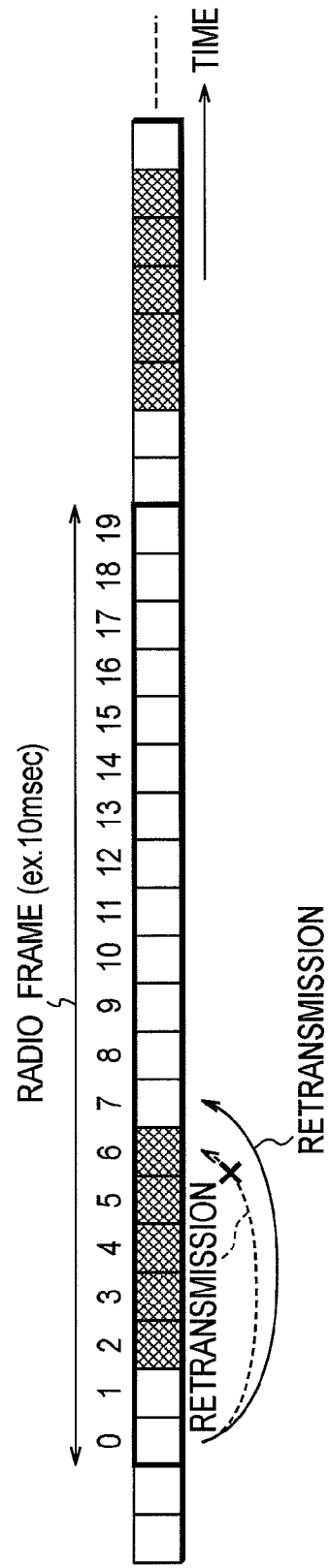
FIG. 2 is an explanatory view showing asynchronous HARQ.

In FIG. 2, each of numeric values (0 to 19) above boxes indicates a sub-frame number.

In the asynchronous HARQ, the retransmission opportunity is assigned to the data transmitted through a process having the process number "0," so that the data is to be transmitted at an any timing after a certain time period has elapsed from a timing of the first transmission of the data (for example, in an arbitrary sub-frame after the sub-frame having a sub frame number "5").

However, when the sub-frame having a sub frame number "6" is used for uplink transmission in the MBMS or the TDD (Time Division Duplex), for example, the sub-frame having a sub frame number "6" cannot be used for retransmitting the data.

In this case, the retransmission opportunity is assigned to the data so that the data is to be transmitted in a sub-frame after the sub-frame having a sub frame number "6" (for example, in the sub-frame having a sub frame number "7").

Thus, a timing (sub-frame) at which data transmitted through a particular process is retransmitted is unknown in the asynchronous HARQ. Accordingly, it is required for the transmission side apparatus to be notified of the process number that indicates data retransmitted in a predetermined sub-frame.

Figure 3:
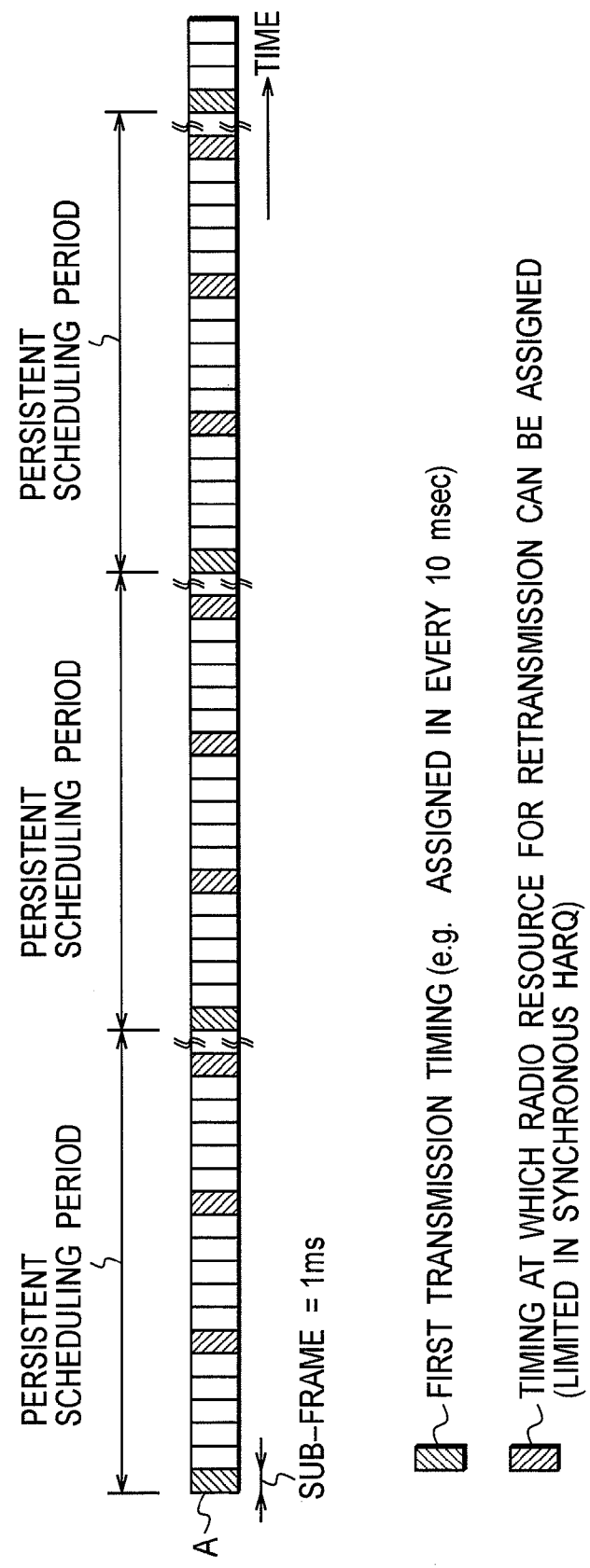
FIG. 3 is an explanatory view showing a transmission timing and assignment of scheduling information when applying synchronous HARQ to persistent scheduling.

With reference to FIG. 3, a description will be given for an example in which the synchronous HARQ is used as a retransmission control processing for a mobile station to which the persistent scheduling is applied.

When the persistent scheduling is performed, a configuration is employed in which scheduling information is notified at an any timing in each persistent scheduling period (for example, in a first sub-frame A). Here, the scheduling information indicates a mobile station to which a radio resource is fixedly assigned in each sub-frame.

In each persistent scheduling period, the radio resource for retransmitting the data that is transmitted in each sub-frame is assigned at a timing in a predetermined retransmission interval after a certain time period has elapsed (such as six sub-frames) since the Ack/Nack is transmitted from the receiving side apparatus in a corresponding sub-frame.

However, in a downlink, a timing at which the radio resource assignment for the data retransmission can be performed may compete with a timing at which data can be transmitted through a broadcast channel (BCH) or an MBMS Channel (MCH).

As mentioned above, in the synchronous HARQ, the data can be retransmitted only at a predetermined timing. Hence, when the transmission timing competes with the timing at which data can be transmitted through the BCH or the MCH, a delay occurs in the data retransmission. This causes a problem of less flexibility in setting of the data retransmission opportunities.

Incidentally, as shown in the example of FIG. 3, the present invention is not limited to an example in which the persistent scheduling period consists of 20 sub-frames.

Meanwhile, with reference to FIG. 4, a description will be given for an example in which the asynchronous HARQ is used as the retransmission control processing for a mobile station to which the persistent scheduling is applied.

When the persistent scheduling is performed, a configuration is employed in which the scheduling information is notified at an any timing in each persistent scheduling period (for example, in a first sub-frame A). Here, the scheduling information is information that indicates a mobile station to which a radio resource is fixedly assigned in each sub-frame.

In each persistent scheduling period, the radio resource for retransmitting the data transmitted in each sub-frame is assigned so that the data is retransmitted at a timing after a certain time period has elapsed from a timing of a first transmission of the data (for example, in a sub-frame A) (for example, after a minimum time required for the retransmission control processing has elapsed). In the example of FIG. 4, the radio resource for retransmitting the data transmitted in each sub-frame is assigned in an arbitrary sub-frame after 5 sub-frames from the sub-frame A.

Accordingly, even when the timing after a certain time period has elapsed from the first transmission timing competes with the timing at which the data can be transmitted through the BCH or the MCH, the delay in the data retransmission does not occur as in the case of the synchronous HARQ.

Therefore, in this embodiment, a description will be given for an example in which the asynchronous HARQ is used for a certain radio bearer (logical channel that can provide QoS) as the retransmission control processing for a mobile station to which the persistent scheduling for transmitting the data at a predetermined timing is applied.

Figure 4:
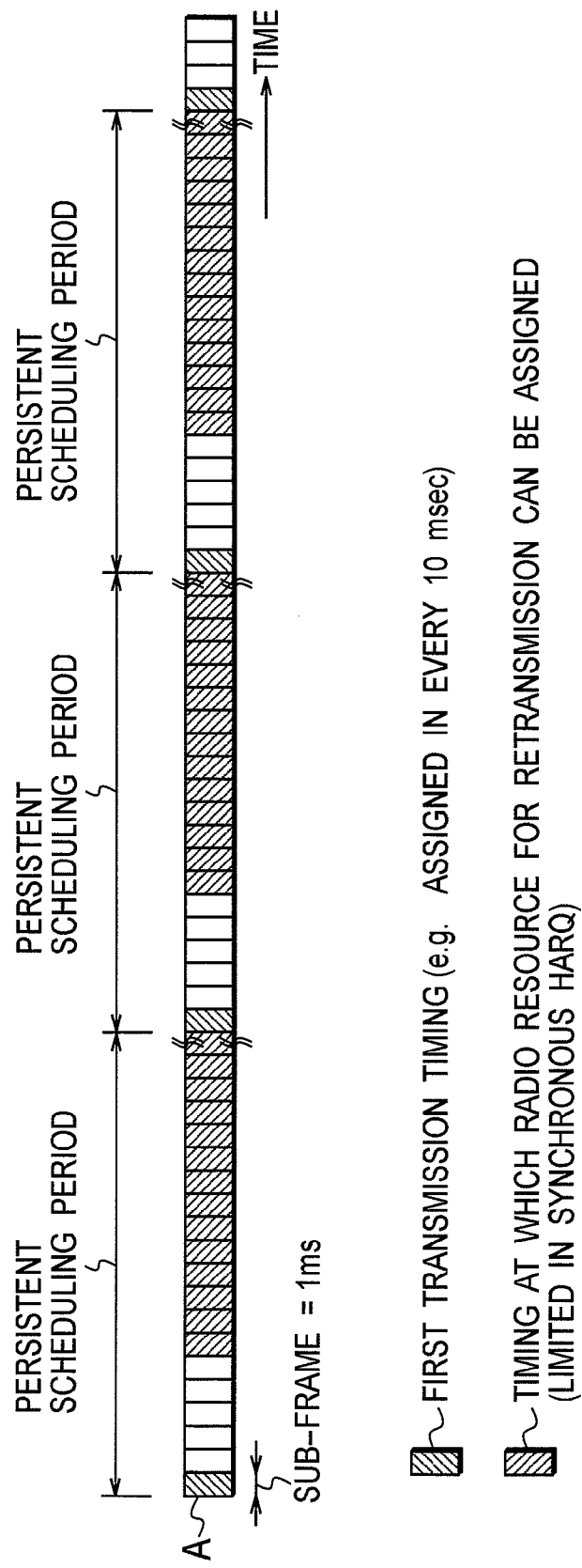
FIG. 4 is an explanatory view showing a transmission timing and assignment of scheduling information when applying asynchronous HARQ to persistent scheduling.

It should be noted that, as shown in the example of FIG. 4, the present invention is not limited to a case where the persistent scheduling period consists of 20 sub-frames.

The base station 100 according to this embodiment will be described with reference to FIG. 5.

Figure 5:
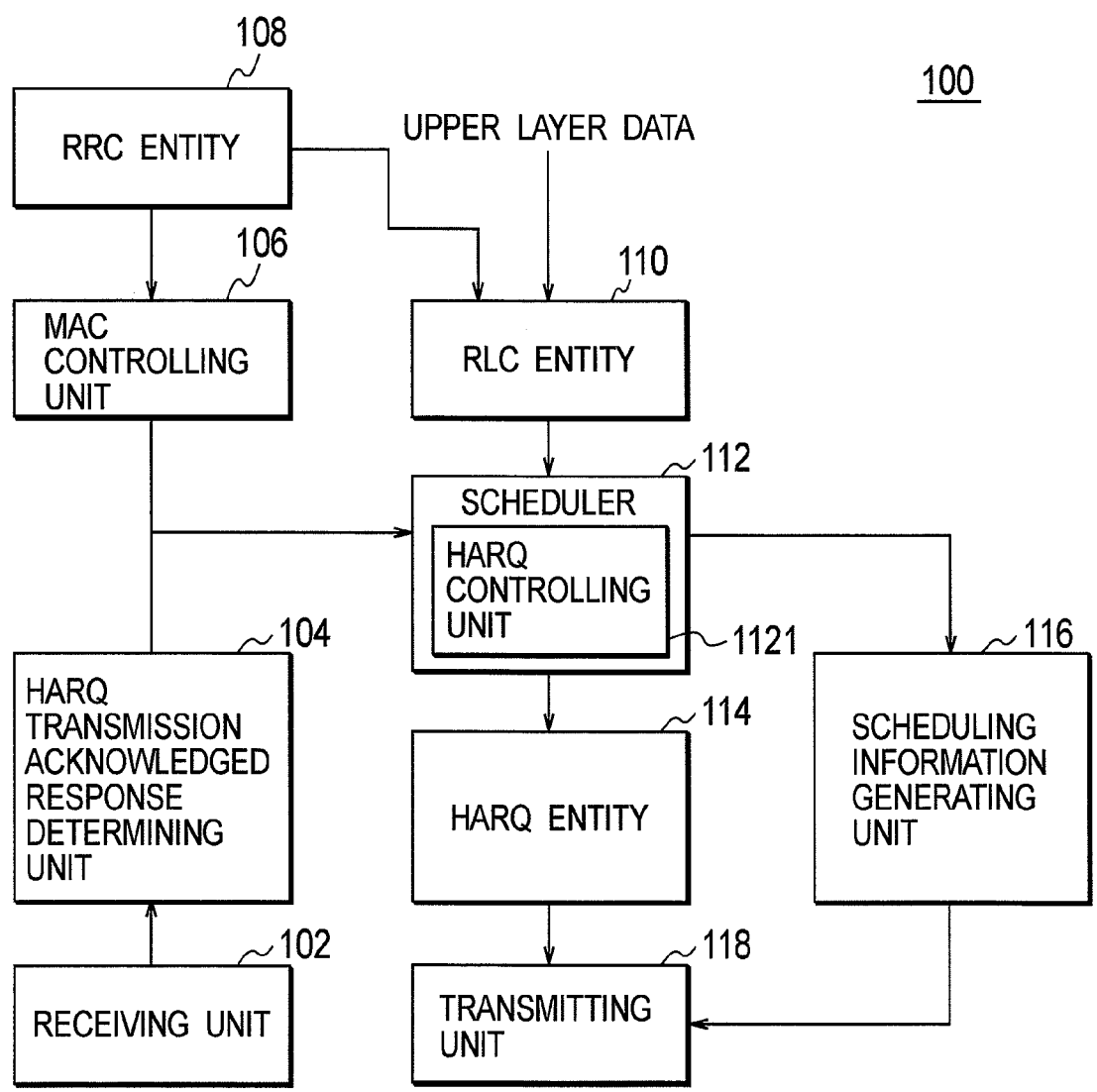
FIG. 5 is a partial block diagram showing a base station according to an example of the present invention.

As shown in FIG. 5, the base station 100 according to this embodiment includes a receiving unit 102, a HARQ transmission acknowledged response determining unit 104, a MAC controlling unit 106, an RRC entity 108 as process number determination means, an RLC entity 110, a scheduler 112 as scheduling means, a HARQ entity 114, a scheduling information generating unit 116 as scheduling information generating means, and a transmitting unit 118 as notifying means. The scheduler 112 includes a HARQ controlling unit 1121.

The RRC entity 108 is configured to determine a process number to be used for each mobile station when the HARQ control is performed, and to notify, to each mobile station, the determined process number through the RLC entity 110 by using an RRC signaling.

According to this configuration, a process number to be used for each mobile station can be reserved when the HARQ is performed.

For example, when a setting is applied in which only a process having a process number #5 may be continuously assigned to a voice bearer, it is no longer necessary to notify on what process number process to use for performing the HARQ control. In other words, the receiving side apparatus knows that the data is retransmitted through the process having a process number #5.

The RLC entity 110 is configured to divide or combine the inputted upper layer data, and input the divided or combined data to the scheduler 112.

The HARQ transmission acknowledged response determining unit 104 is configured to receive the transmission acknowledged response (Ack/Nack) for shared channel data. Here, the transmission acknowledged response (Ack/Nack) is transmitted from the mobile station 200 and is received by the receiving unit 102.

The HARQ transmission acknowledged response determining unit 104 determines whether or not to retransmit the data already transmitted to the mobile station, based on the inputted transmission acknowledged response (Ack/Nack), and inputs, to the scheduler 112, a HARQ transmission acknowledged response decision signal indicating the determined result.

The scheduler 112 is configured to generate data to be transmitted through a shared channel (shared channel data) based on the inputted upper layer data.

The scheduler 112 is also configured to perform a scheduling (usual scheduling) for assigning, at each TTI, a transmission opportunity (radio resource) to a mobile station having a preferable radio channel condition, for example.

The scheduler 112 is also configured to determine, based on a predetermined condition, a transition to the persistent scheduling is to be executed.

When determining to transit to the persistent scheduling, the scheduler 112 instructs the scheduling information generating unit 116 to generate the scheduling information.

When the HARQ transmission acknowledged response decision signal inputted from the HARQ transmission acknowledged response determining unit 104 is a retransmission instruction, the scheduler 112 instructs the scheduling information generating unit 116 to generate the scheduling information.

The scheduler 112 is configured to buffer the generated shared channel data in the HARQ entity 114, and to transmit the shared channel data to a predetermined mobile station through the transmitting unit 118 at a transmission timing (transmission opportunity) assigned to the predetermined mobile station.

The scheduler 112 is configured to retransmit the shared channel data buffered in the HARQ entity 114, through the transmitting unit 118 after the scheduling information is transmitted to the predetermined mobile station.

Meanwhile, when the inputted HARQ transmission acknowledged response decision signal is not a retransmission instruction, and when the shared channel data yet to be transmitted is buffered in the HARQ entity 114, the scheduler 112 is configured to transmit the buffered shared channel data to the predetermined mobile station through the transmitting unit 118, at the assigned transmission timing that is a timing assigned to the predetermined mobile station.

The scheduler 112 also determines that re-notification of the scheduling information is necessary when one persistent scheduling period is terminated and another persistent scheduling period starts.

The scheduling information generating unit 116 is configured to generate the scheduling information in accordance with the instruction from the scheduler 112.

For example, the scheduling information generating unit 116 is configured to generate the scheduling information including at least a part of information shown in FIG. 6.

As shown in FIG. 6 as an example, the scheduling information includes, as category 1, "user ID (UE ID)," "resource assignment information (Resource assignment)," "number of sub-frames (Duration assignment)," and "persistent scheduling start flag (Persistent start flag)." As category 2, the scheduling information includes "multi-antenna related information (Multi-antenna related info)," "modulation scheme information (Modulation scheme)," and "payload size (Payload size)." As category 3, the scheduling information includes "process number (Process #)," "information indicating a type of redundant bit (RV (Redundancy Version))," and "new data indication (NDI)."

Here, "UE ID" is information that indicates a predetermined mobile station. Further, the persistent scheduling period may be in frame units or in sub-frame units.

"Resource assignment" is information that indicates a radio resource assigned to a predetermined mobile station at a predetermined timing in the persistent scheduling. Here, a radio resource is specified in units called resource blocks (or resource units) that is defined by a group of subcarriers.

"Duration assignment" is information that indicates a effective term (for example, in sub-frame units) of a radio resource assigned by using the scheduling information. Alternatively, an identifier indicating that the effective term is indefinite may be notified as "Number of sub-frames."

"Persistent start flag" is information for notification of start and stop of the persistent scheduling.

"Multi-antenna related information" is control information required when MIMO (Multi-Input-Multi-Output) transmission is performed.

"Modulation scheme" is information that indicates a modulation scheme used in a radio resource assigned by using the scheduling information.

"Payload size" is information that indicates units (transport block size) of the information forwarded from layer 1 (L1) to layer 2 (L2) and the information forwarded from layer 2 (L2) to layer 1 (L1).

"Process #" is information for identifying a process in the HARQ process, the process used for transmitting the data. Here, the process is assigned by the scheduling information.

"RV" is information used for notification of a redundant bit transmission method (puncturing information) related to HARQ control.

"NDI" is information used for notifying whether or not the data transmitted through a radio resource assigned by the scheduling information is transmitted for the first time.

In this embodiment, a description will be given for an example in which the scheduling information generating unit 116 generates the scheduling information including all the information mentioned above when the transition from the usual scheduling to the persistent scheduling is executed.

The scheduling information generating unit 116 is configured to notify, to the mobile station 200, the generated scheduling information through the transmitting unit 118.

For example, the scheduling information generating unit 116 may be configured to notify, to the mobile station 200, the scheduling information through an L1/L2 control channel (such as a PDCCH: Physical Downlink Control Channel).

Alternatively, the scheduling information generating unit 116 may be configured to notify the scheduling information when setting a radio bearer.

For example, the scheduling information generating unit 116 may be configured to notify the scheduling information when the persistent scheduling is set for a certain radio bearer.

Further, the scheduling information generating unit 116 may also be configured to notify, to a predetermined mobile station, a process number, based on the scheduling information. Here, the process number identifies a HARQ process in which the data is transmitted to the predetermined mobile station, when the persistent scheduling is performed.

The MAC controlling unit 106 may be configured to notify, to a predetermined mobile station, the process number determined by the RRC entity 108, as a MAC control PDU.

According to this configuration, the process number to be used when the HARQ control is performed can be reserved.

For example, when a setting is applied in which only a process having a process number #5 may be continuously assigned to a voice bearer, it is no longer necessary to notify on what process number process to use for performing the HARQ control. In other words, the receiving side apparatus knows that the data is retransmitted through the process having a process number #5. Additionally, signaling by using the RRC can be also eliminated.

Alternatively, the MAC controlling unit 106 may be configured to determine a process number to be used for each mobile station when HARQ control is performed, and to notify, to each mobile station, the determined process number. For example, the MAC controlling unit 106 is configured to notify, to each mobile station, the determined process number, as a MAC control PDU.

The reservation of a process number as mentioned above is performed, for example, when the persistent scheduling is started.

Figure 7:
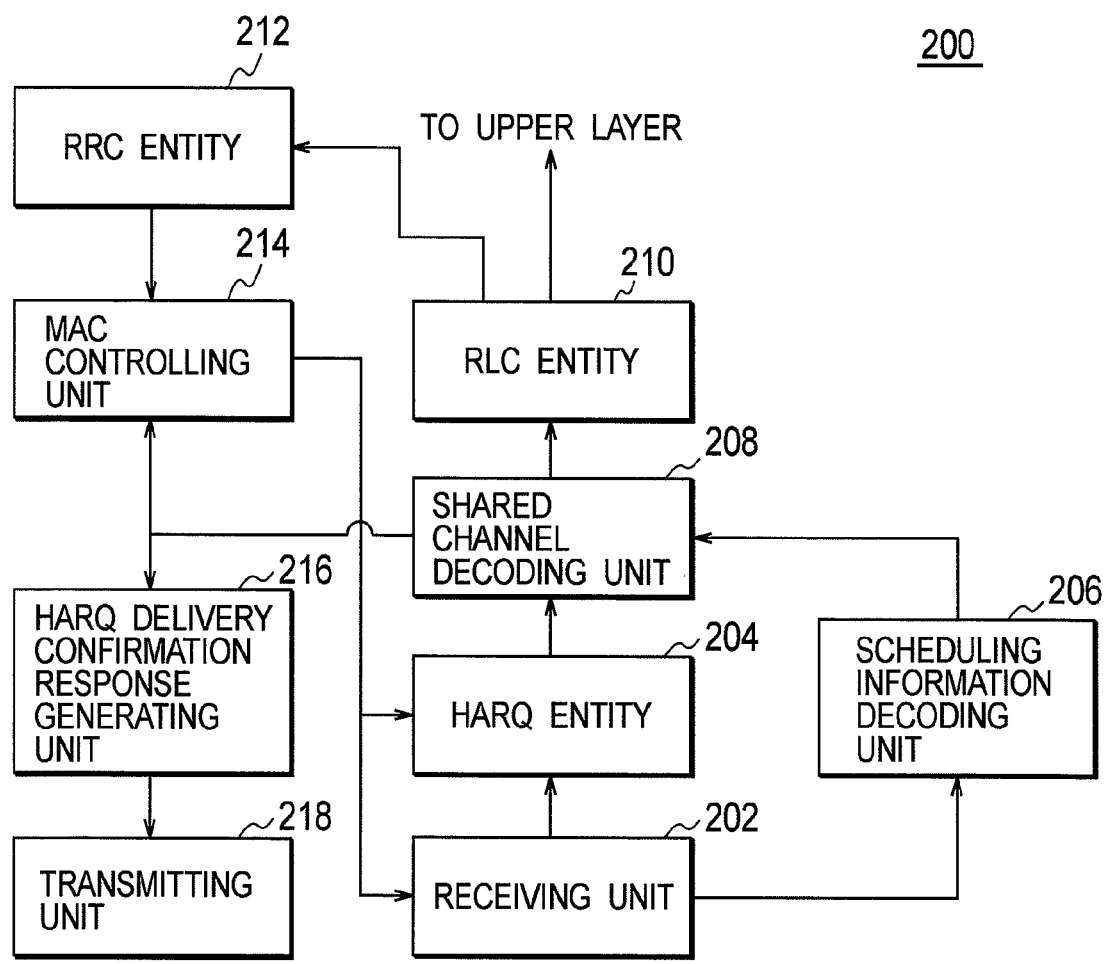
FIG. 7 is a partial block diagram showing a mobile station according to an example of the present invention.

Next, the mobile station 200 according to this embodiment will be described with reference to FIG. 7.

The mobile station 200 according to this embodiment includes a receiving unit 202, a HARQ entity 204, a scheduling information decoding unit 206 as scheduling information decoding means, a shared channel decoding unit 208, an RLC entity 210, an RRC entity 212, a MAC controlling unit 214 as combining means, a HARQ transmission acknowledged response generating unit 216, and a transmitting unit 218.

The receiving unit 202 is configured to receive the scheduling information transmitted from the base station 100 and to input the scheduling information to the scheduling information decoding unit 206. The receiving unit 202 is configured to receive the shared channel data transmitted from the base station 100 and to buffer the data in the HARQ entity 204.

The scheduling information decoding unit 206 is configured to decode the scheduling information inputted by the receiving unit 202, and to input the decoded scheduling information to the shared channel decoding unit 208.

The shared channel decoding unit 208 is configured to decode the shared channel data buffered in the HARQ entity 204 based on the scheduling information inputted by the scheduling information decoding unit 206.

Here, based on a CRC (Cyclic Redundancy Check) determination, the shared channel decoding unit 208 instructs the HARQ transmission acknowledged response generating unit 216 to notify the base station 100 of an Ack, when the decoding of the shared channel data has been successful. In a same manner, based on the CRC (Cyclic Redundancy Check) determination, the shared channel decoding unit 208 instructs the HARQ transmission acknowledged response generating unit 216 to notify the base station 100 of a Nack, when the decoding of the shared channel data has been unsuccessful The shared channel decoding unit 208 is configured to input the decoded shared data channel data to the RLC entity 210.

The RLC entity 210 is configured to form the PDU (Protocol Data Unit) based on the shared channel data inputted by the shared channel decoding unit 208, and to transmit the PDU to an upper layer.

The RLC entity 210 is also configured to input a process number to the MAC controlling unit 106 through the RRC entity 212, when the RLC entity 210 is notified, by the RRC signalling, of the process number identifying a process in the HARQ.

The MAC controlling unit 214 is configured to reserve, that is, to temporarily store, the inputted process number.

The MAC controlling unit 214 is configured to control the HARQ entity 204 and the receiving unit 202, based on the inputted process number.

For example, the MAC controlling unit 214 is configured to combine the data (shared channel data transmitted in a first transmission (downlink data)) in which an error is detected, with the data retransmitted in a process of the inputted process number. Here, the data in which the error is detected is stored in the HARQ entity 204.

The HARQ transmission acknowledged response generating unit 216 is configured to generate a transmission acknowledged response in the HARQ, in accordance with the instruction from the shared channel decoding unit 208, and to transmit, to the base station 100 through the transmitting unit 218, the transmission acknowledged response.

Next, an operation of a radio communication system according to this embodiment will be described.

Figure 8:
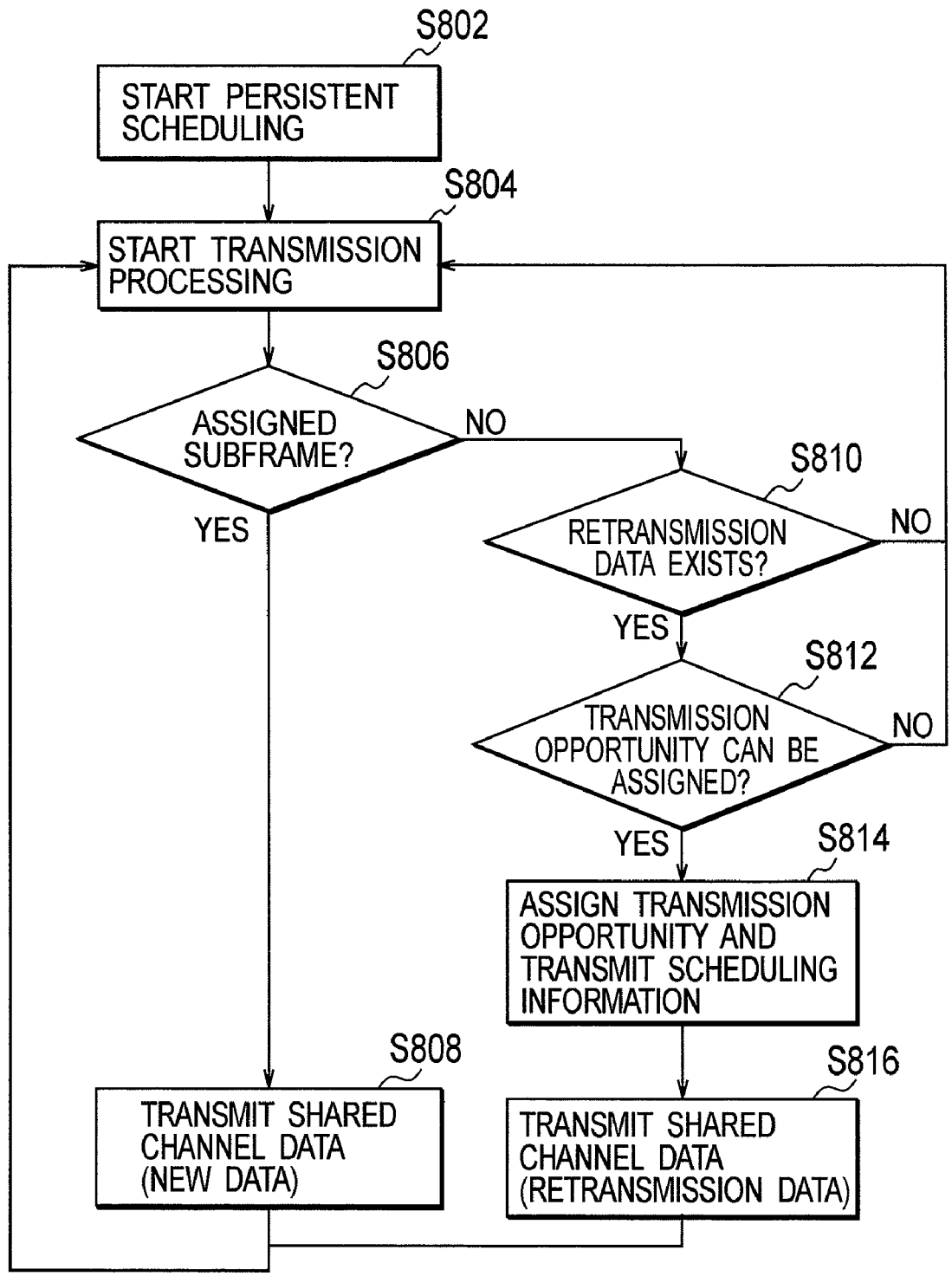
FIG. 8 is a flow chart showing an operation of the base station according to an example of the present invention.

First, with reference to FIG. 8, an operation of the base station 100 according to this embodiment will be described.

In step S802, the scheduler 112 starts the persistent scheduling.

For example, when starting the voice communication, the scheduler 112 notifies, to a predetermined radio bearer, that the persistent scheduling may be started.

Alternatively, the scheduler 112 may perform the signaling that indicates the persistent scheduling is performed, so as to clearly notify that the persistent scheduling is about to be performed in a period where the usual scheduling is performed.

In step S804, the scheduler 112 starts the transmission processing for a predetermined mobile station 200.

In step S806, the scheduler 112 determines whether or not the next sub-frame is a sub-frame fixedly assigned to the predetermined mobile station 200 (assigned sub-frame) in the persistent scheduling period.

In other words, the scheduler 112 determines whether or not the next transmission timing is a transmission timing fixedly assigned to the predetermined mobile station 200 (that is, a transmission timing within the persistent scheduling period).

For example, the sub-frame to be fixedly assigned to the predetermined mobile station 200 (transmission timing) in the persistent scheduling period is determined when a radio bearer between the predetermined mobile station 200 and the radio base station 100 is set.

When the sub-frame is determined as being fixedly assigned to the predetermined mobile station 200 (YES in step S806), in step S808, the scheduler 112 transmits, in the sub-frame, the shared channel data buffered in the HARQ entity 114, through the transmitting unit 118.

On the other hand, when the sub-frame is determined as not being fixedly assigned to the predetermined mobile station 200 (NO in step S806), in step S810, the HARQ controlling unit 1121 of the scheduler 112 determines whether or not the data to be retransmitted to the predetermined mobile station 200 exists.

When it is determined that the data to be retransmitted does not exist (NO in step S810), the operation returns to Step S804.

On the other hand, when it is determined that the data to be retransmitted exists (YES in step S810), in step S812, the HARQ controlling unit 1121 determines whether or not a transmission opportunity can be assigned to the data to be retransmitted.

When it is determined that the transmission opportunity cannot be assigned (NO in step S812), the operation returns to Step S804.

On the other hand, when it is determined that the transmission opportunity can be assigned (YES in step S812), in step S814, the HARQ controlling unit 1121 instructs the scheduling information generating unit 116 to transmit the scheduling information.

Then, the scheduling information generating unit 116 generates scheduling information in accordance with the instruction from the HARQ controlling unit 1121, and transmits the generated scheduling information to the predetermined mobile station 200 through the transmitting unit 118.

In step S816, the HARQ controlling unit 1121 retransmits, to the predetermined mobile station 200 through the transmitting unit 118, the data in which the error is detected in the first transmission, among the shared channel data buffered in the HARQ entity 114.

Figure 9:
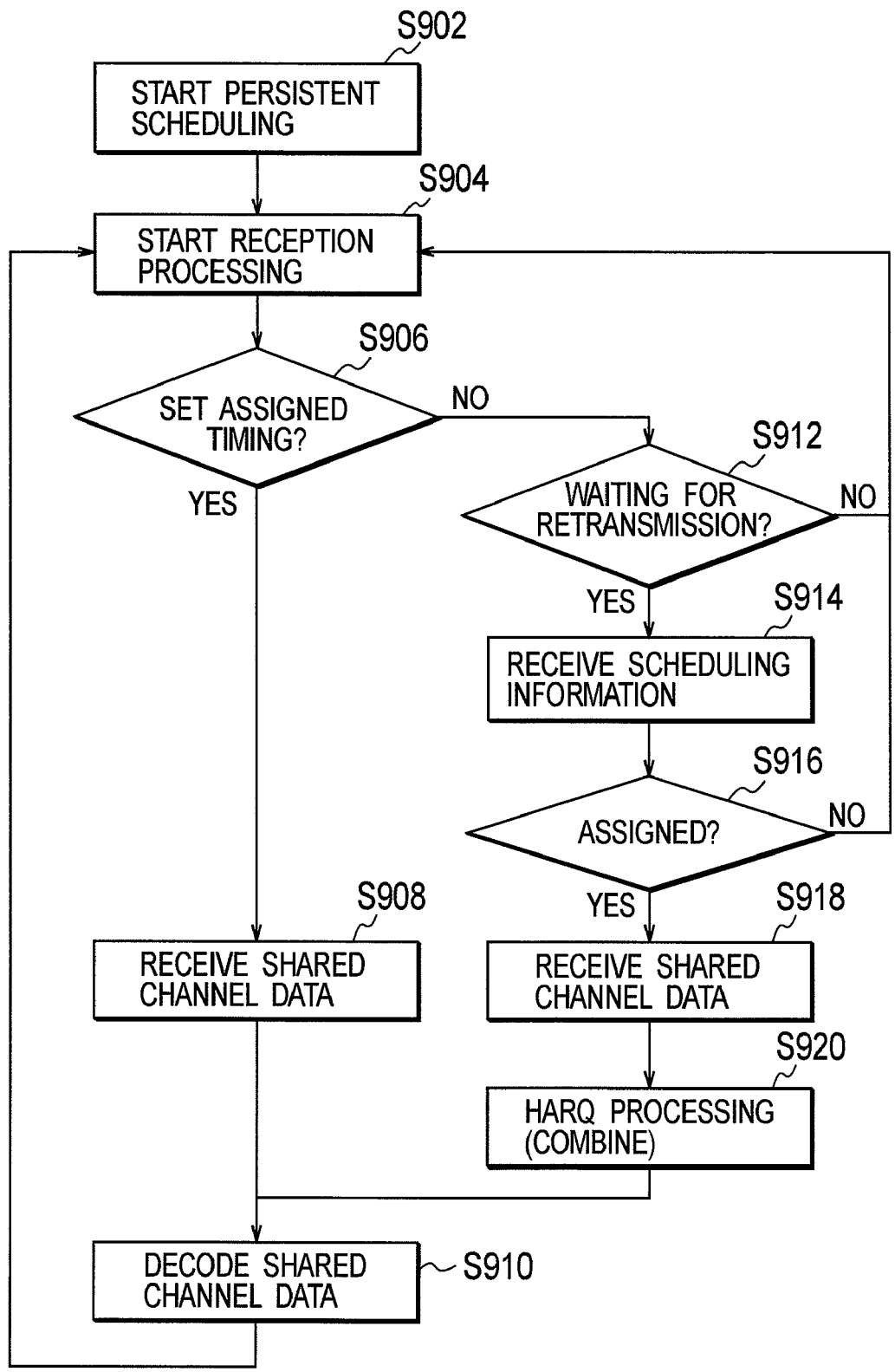
FIG. 9 is a flow chart showing an operation of the mobile station according to an example of the present invention.

Secondly, with reference to FIG. 9, an operation of the mobile station 200 according to this embodiment will be described.

In step S902, the persistent scheduling is started in the mobile station 200. In step S904, the receiving unit 202 starts a reception processing for the shared channel data (downlink data) transmitted from the base station 100.

In step S906, the shared channel decoding unit 208 determines whether or not the next reception timing is a timing set as the assigned transmission timing as described above.

When it is determined that the timing is the assigned transmission timing (YES in step S906), in step S908, the receiving unit 202 receives the shared channel data, and buffers the received shared channel data in the HARQ entity 204.

In step S910, the shared channel decoding unit 208 decodes the shared channel data buffered in the HARQ entity 204.

Meanwhile, when the timing is determined not as being the assigned transmission timing (NO in step S906), in step S912, the receiving unit 202 determines whether or not the mobile station 200 is waiting for the retransmission of the scheduling information.

When it is determined that the mobile station 200 is not waiting for the retransmission (NO in step S912), the operation returns to Step S904. Note that, even when it is determined that the mobile station 200 is not waiting for the retransmission (NO in step S912), the operation proceeds to Step S916 when other radio bearer may possibly be assigned.

On the other hand, when it is determined that the mobile station 200 is waiting for the retransmission (YES in step S912), the receiving unit 202 receives the scheduling information in step S914.

Then, the receiving unit 202 inputs the received scheduling information to the scheduling information decoding unit 206. The scheduling information decoding unit 206 decodes the inputted scheduling information, and inputs the scheduling information to the shared channel decoding unit 208.

In step S916, the MAC controlling unit 214 determines whether or not an assignment of the radio resource to the mobile station 200 exists. In other words, the MAC controlling unit 214 determines whether or not a timing in which a transmission opportunity assigned to the shared channel data to be transmitted to the mobile station 200 exists.

When it is determined that the assignment of the radio resource to the mobile station 200 does not exist (NO in step S916), the operation returns to Step S904.

On the other hand, when it is determined that the assignment of the radio resource to the mobile station 200 exists (YES in step S916), in step S918, the MAC controlling unit 214 instructs the receiving unit 202 to receive the shared channel data. As a result, the receiving unit 202 receives the shared channel data, and inputs the received shared channel data to the HARQ entity 204.

In step S920, the MAC controlling unit 214 performs the HARQ processing. In the HARQ processing, the data in which the error is detected is combined with the retransmitted data, from among the shared channel data buffered in the HARQ entity 204.

According to the radio communication system of this embodiment, the scheduling information can be notified to the predetermined mobile station 200 when the usual scheduling transits to the persistent scheduling, such as when the persistent scheduling starts.

According to the radio communication system of this embodiment, the scheduling information can be notified to the predetermined mobile station 200 when the radio bearer between the predetermined mobile station 200 and the base station 100 is set.

According to the radio communication system of this embodiment, the base station 100 can notify, to the mobile station, the scheduling information at an any timing in the persistent scheduling. Further, the mobile station 200 can receive the retransmitted shared channel data (downlink data) at an any timing when the persistent scheduling is performed.
(Modification 1)

In the first embodiment as described above, the description has been given for an example in which the resource assignment information included in the scheduling information indicates the radio resource in the downlink, which is fixedly assigned to the predetermined mobile station 200 at a predetermined timing. However, the present invention is not limited to this example. Needless to say, the invention is applicable to an example in which the resource assignment information included in the scheduling information indicates the radio resource in an uplink, which is fixedly assigned to the predetermined mobile station 200 at a predetermined timing.

According to this modification 1, the persistent scheduling can be performed in the uplink communication.
(Modification 2)

Modification 2 is an example in which the present invention is applied to the communication such as VoIP communication, in which voiced sections and voiceless sections exist in a radio bearer during a communication.

For example, in Modification 2, a configuration may be employed in which the voiced section is defined as the aforementioned persistent scheduling period, and the aforementioned scheduling information is notified every time the persistent scheduling period (that is, the voiced section) starts, thereby changing the radio resource fixedly assigned to the mobile station related to the radio bearer.

The present invention has been described by using the above-described embodiments. However, it is obvious for those who are in the art that the present invention is not intended to be limited to the above-described embodiment. It is understood that the examples and embodiments described herein are for illustrative purpose only and that various modifications or changes will be suggested to one skilled in the art without departing from the scope of the present invention. Accordingly, this disclosure should not be construed that the description and the drawings, which constitute one part of this disclosure, are to limit the present invention.

INDUSTRIAL APPLICABILITY

As described above, the present invention makes it possible to provide a mobile station, a base station, and a communication control method that can perform a retransmission control processing when the persistent scheduling is performed, when the persistent scheduling and the usual scheduling are simultaneously applied.

Moreover, the present invention also makes it possible to provide a mobile station, a base station, and a communication control method, which can change a radio resource fixedly assigned to the mobile station in each persistent scheduling period.

The invention claimed is:

1. A base station, comprising:
a scheduling unit configured to perform a persistent scheduling for transmitting data at a predetermined timing; and
a retransmission control unit configured to perform an asynchronous HARQ on the data, when the persistent scheduling is performed;
a process number determining unit configured to determine a process number that identifies a HARQ process for transmitting the data to a predetermined mobile station, when the persistent scheduling is performed; and
a notification unit configured to notify, to the predetermined mobile station, the process number determined by the process number determining unit, wherein
the notification unit is configured to notify, to the predetermined mobile station, the process number determined by the process number determining unit, by using an RRC signaling when the persistent scheduling is started.

2. A communication control method, comprising the steps of:
(A) performing, between a base station and a predetermined mobile station, persistent scheduling for transmitting data at a predetermined timing;
(B) performing, between the base station and the predetermined mobile station, an asynchronous HARQ on the data, when the persistent scheduling is performed;
(C) determining, at the base station, a process number that identifies a HARQ process for transmitting the data to the predetermined mobile station, when the persistent scheduling is performed; and
(D) notifying, from the base station to the predetermined mobile station, the determined process number, wherein in step (D), the base station notifies, to the predetermined mobile station, the determined process number by using an RRC signaling, when the persistent scheduling is started.

* * * * *